United States Patent
Pagden

(10) Patent No.: US 6,322,731 B1
(45) Date of Patent: Nov. 27, 2001

(54) CONTINUOUS EXTRUSION PROCESS USING ORGANIC WASTE MATERIALS

(75) Inventor: Kenneth Lindsay Pagden, Leeton (AU)

(73) Assignee: Ricegrowers' Co-Operative Ltd. (AU)

( * ) Notice: Subject to any disclaimer, the term of this patent is extended or adjusted under 35 U.S.C. 154(b) by 0 days.

(21) Appl. No.: 09/367,529

(22) PCT Filed: Feb. 11, 1998

(86) PCT No.: PCT/AU98/00077

§ 371 Date: Dec. 29, 1999

§ 102(e) Date: Dec. 29, 1999

(87) PCT Pub. No.: WO98/35811

PCT Pub. Date: Aug. 20, 1998

(30) Foreign Application Priority Data

Feb. 17, 1997 (AU) .................................... PO 5150
Jan. 6, 1998 (AU) .................................... 50376/98

(51) Int. Cl.[7] .............................. B27N 3/28; B29C 47/54; B29C 47/92
(52) U.S. Cl. ................ 264/40.1; 264/40.5; 264/109; 264/118; 264/122; 425/135; 425/149; 425/315; 425/325; 425/378.1; 425/380; 425/408
(58) Field of Search ................... 264/40.1, 40.5, 264/109, 118, 122; 425/135, 149, 315, 325, 378.1, 380, 408

(56) References Cited

U.S. PATENT DOCUMENTS

| 4,358,418 | 11/1982 | Heggenstaller . |
| 4,611,979 | 9/1986 | Hegenstaller et al. . |
| 4,645,631 | 2/1987 | Hegenstaller et al. . |
| 5,413,746 | * 5/1995 | Birjukov .............................. 264/118 |

* cited by examiner

*Primary Examiner*—Leo B. Tentoni
(74) *Attorney, Agent, or Firm*—Webb Ziesenheim Logsdon Orkin & Hanson, P.C.

(57) ABSTRACT

A substantially continuous method for forming a structural panel of indefinite length is disclosed. The method includes the steps of preparing a settable mixture, conveying the mixture in a flowable state to a load chamber, progressively forcing the mixture from the load chamber through an inlet toward an outlet of an open ended mold chamber by a compression device at least partially curing the mixture within the mold chamber, resisting movement of the mixture through the mold chamber until a predetermined consolidation pressure or density within the mold chamber is achieved, subsequently allowing movement of the mixture through the mold chamber in response to further mixture being forced through the inlet by the compression device, and allowing the mixture to cure, thereby progressively forming a structural panel of substantially indefinite length.

31 Claims, 4 Drawing Sheets

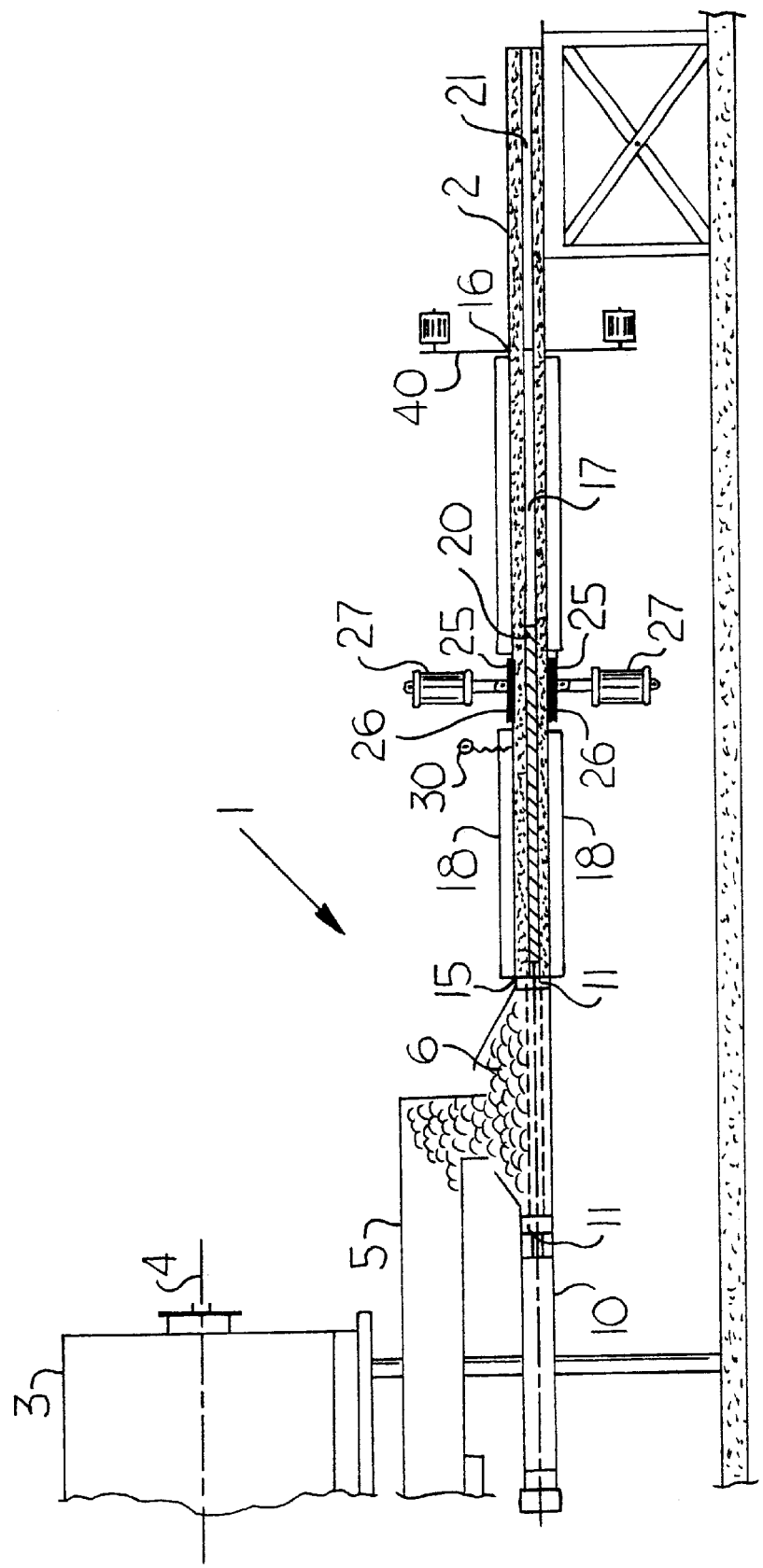

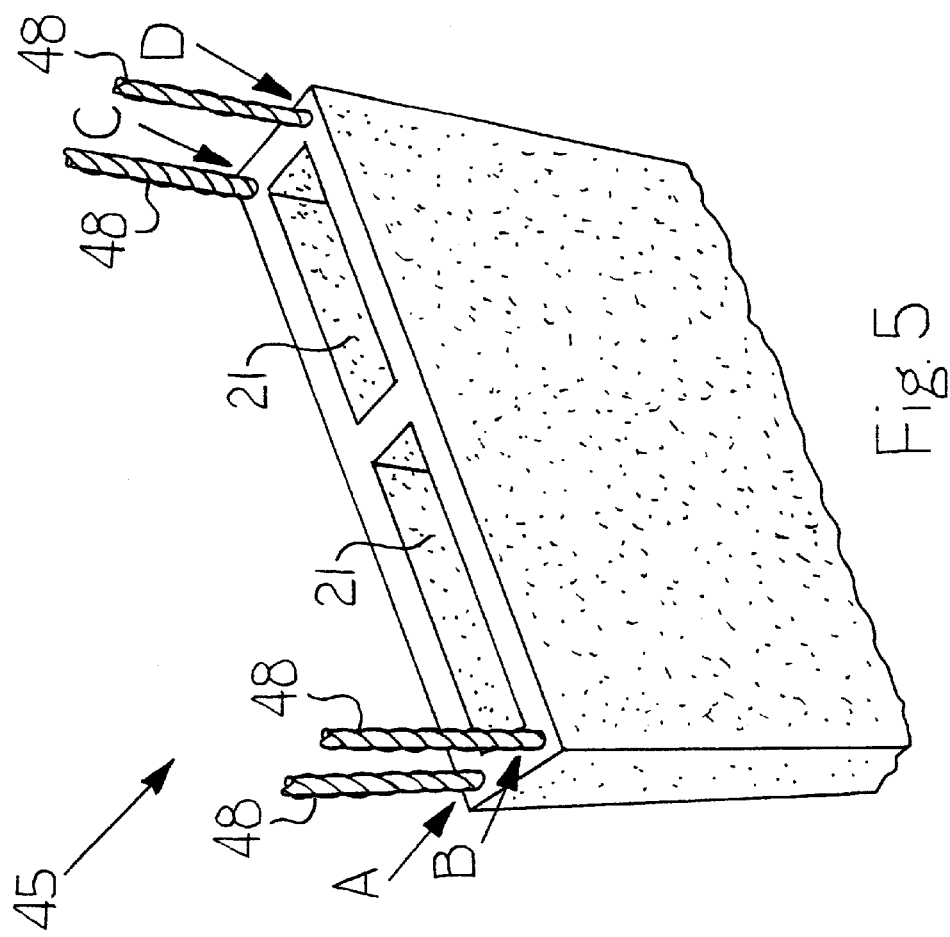
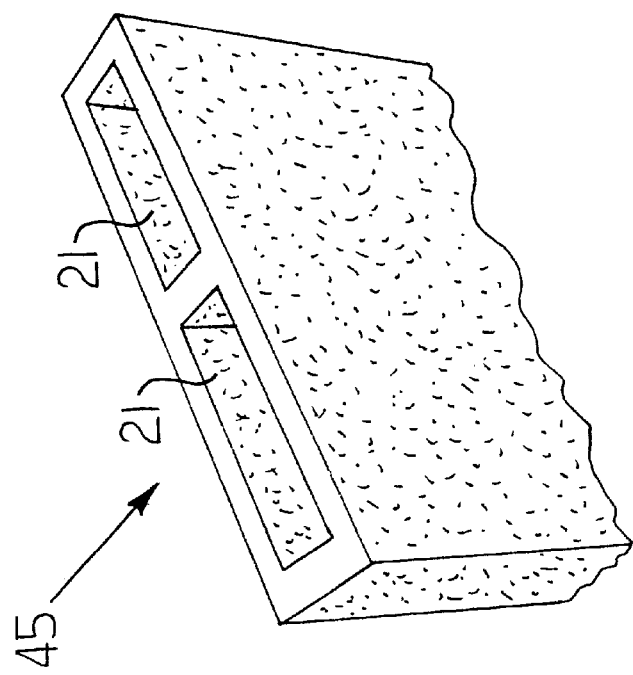

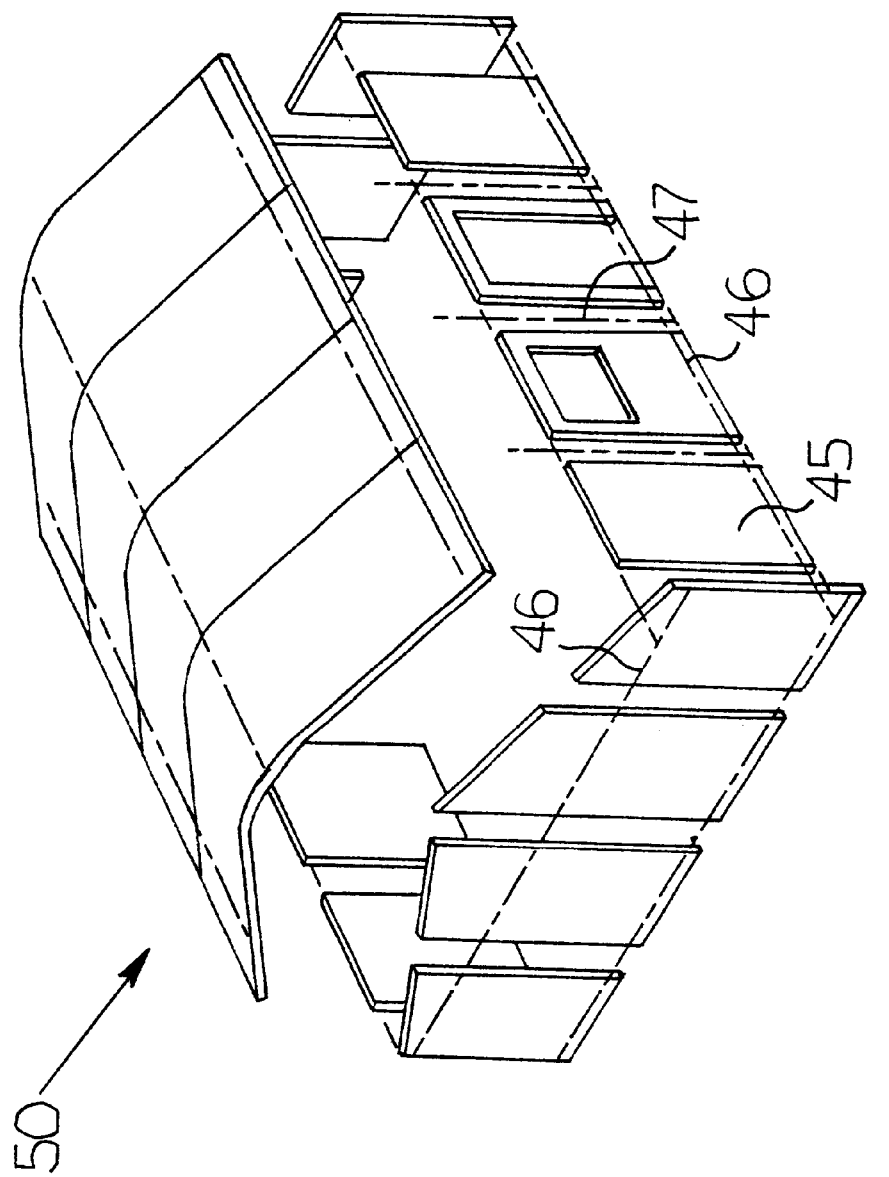

CONTINUOUS EXTRUSION PROCESS USING ORGANIC WASTE MATERIALS

FIELD OF THE INVENTION

The present invention relates to an apparatus and method for forming a structural panel of indefinite length.

BACKGROUND OF THE INVENTION

This invention has been developed primarily for use in the manufacture of pallets and building panels, using rice husk or hull. Accordingly, the invention will be described primarily in relation to these applications and this material. It will be appreciated, however, that the invention is not limited to these particular fields of use.

One application for structural panels is in the construction of pallets which, as is well known, are widely used for the storage, transportation and handling of bulk materials. The vast majority are formed from timber planks and beams nailed together to define a generally planar support surface and longitudinal channels adapted for engagement by fork-lift tynes. A major problem with such panels, however, is that the nails tend to work loose over time as a result of timber shrinkage, impact damage, general wear and tear, and misuse. Once the nail heads begin to protrude, bagged products such as grain and other commodities begin to be subjected to unacceptable damage. This renders the pallets effectively unusable, without costly maintenance and repair. Timber pallets are also prone to splintering, which gives rise to similar problems. A further problem with wooden pallets is that in wet environments, the wood can rot, or worse still, provide a damp environment in which harmful bacteria can breed.

In an attempt to overcome these difficulties, particularly in the food industry, plastic moulded pallets have been used. It has become apparent, however, that such pallets will not withstand the heavy duty cycle to which they are inevitably subjected. In an attempt to overcome this problem, reinforced plastic pallets have been produced with multiple strengthening webs and ribs. However, these are subject to a further disadvantage in that the numerous additional recesses and crevices defined between and around the strengthening webs are difficult to clean effectively, and hence allow fungi and bacteria to thrive. Again, this is particularly disadvantageous in the food industry. As a further alternative, metal pallets have been produced. However, it has been found that in order to provide the necessary structural integrity, the weight becomes excessive and/or the cost commercially unviable.

In view of the above, there remains a long felt need for a pallet with a substantially smooth, continuous support surface, which is formed without nails, is easy to clean, is repairable, and which has a heavy duty service capability.

Another application for structural panels is in the field of housing construction. In conventional building techniques, the walls are normally constructed by first erecting a timber frame. The frame is normally clad internally with a suitable laminate material such as plasterboard whilst the external walls are normally formed from weatherboard, brick veneer, or other more contemporary cladding materials such as aluminium sheeting.

These conventional techniques are relatively labour intensive and costly, partly because workers from numerous specialised trades are required. These include builders, carpenters, brick layers, joiners, plasterers and the like, all of which add to the overall cost. A further disadvantage is that these construction techniques consume relatively large quantities of valuable and diminishing resources, especially timber, which are progressively increasing in cost as supplies become less available. A further disadvantage is that conventional housing construction techniques require the vast majority of the construction work to be conducted on site, by skilled labour. There is little scope for initial prefabrication or modular construction and minimal scope for modifying or restructuring a house in a cost-effective manner, once built. Moreover, in the event that a house needs to be demolished or relocated, there is minimal scope for recycling or reusing the constituent materials, which in such circumstances are largely wasted.

All of the above problems are particularly significant in developing countries where the availability of skilled labour is limited and the cost of conventional building materials is often prohibitive. In an attempt to ameliorate some of these problems, various low cost building materials have been developed, such as fibre reinforced cement (FRC) sheeting which can be applied, relatively easily, to a timber framing structure. However, this form of construction gives rise to a "flimsy" subjective impression which is often seen as undesirable compared to brick construction, which gives the impression of solidity. The insulation properties are also minimal, which often necessitates an intermediate layer of insulation in the wall cavity, further adding to the overall cost. Moreover, because the cladding sheets have minimal structural integrity, the conventional framing structure is still required.

In a further attempt to address these problems, the use of composite panels has also been proposed. Panels of this type typically incorporate a series of laminates fabricated from different materials designed to achieve the desired strength to weight characteristics, as well as to provide thermal and acoustic insulation properties. A major problem with known fabrication techniques, however, is that there is a practical limit to the maximum length of the individual panels. This in turn leads to the requirement for smaller panels to be joined end to end to form a combined panel assembly of the necessary size. Typically, however, inadequate techniques for joining the panels have resulted in such structures being relatively weak. The resultant loss of structural integrity has, in turn, resulted in the potential strength characteristics not having been realised in larger scale applications particularly housing. For this reason, composite panels have tended only to be used to form internal partitions and non-load bearing walls, where significant structural integrity is not required. Accordingly, a separate framing structure is still required and the inherent problems associated with conventional building methods have remained largely unsolved.

In view of the above factors, there remains a long felt need for a cost-effective alternative to existing housing construction techniques, which would provide an alternative to the diminishing supplies of raw materials, require less use of skilled labour particularly on site, would lend itself to prefabrication, and which would be modular to some extent so as to allow the flexibility for structures to be built, altered or moved as required at minimal additional cost.

The present invention relates to the manufacture of structural panels and associated products using waste organic material, and in particular rice hull. Each year in Australia and around the world, the processing of rice for human consumption involves the removal of millions of tonnes of rice husks or "hulls". These hulls are particularly difficult to dispose of, because, being formed substantially of lignin, they are essentially waterproof and resistant to biodegradation. Furthermore, the relatively high silicic acid content limits their use as cattle fodder. Even rodents and insects will not consume them.

One means of disposal is to incinerate the hulls at high temperature, which substantially reduces their volume. However, this process is relatively energy inefficient, expensive, and has undesirable effects on the environment, particularly in terms of atmospheric pollution. Due to the difficulties of disposal, some attempts have also been made to use waste rice hulls and similar organic waste materials constructively. They have, for example, been used as insulation in building cavities and other applications. However, this use has hitherto been severely limited due to the lack of structural integrity of the raw material. In an attempt to address this problem, rice hulls have also been mixed with various binding agents. For example, it has been known, although not commonly, to employ a binding agent curable by RF (radio frequency) radiation in order to consolidate the individual rice hulls. However, this has also been found to be an expensive process which is not generally cost effective on a commercial scale. Moreover, to date, the products from this and other techniques have been excessively weak and prone to crumbling. More particularly, they have lacked the requisite structural integrity for use as a self-supporting structural material, which has substantially limited their applicability in many potential fields of use, including the building industry.

In view of the above, it will be appreciated that a process capable of forming a structural product using waste rice hull would address the significant problem of waste disposal, whilst at the same time providing a useful and commercially viable alternative to the diminishing supplies of raw building materials, particularly timber. To date, however, no such process or product has been found.

It is an object of the present invention to overcome or substantially ameliorate at least some of the disadvantages of the prior art.

SUMMARY OF THE INVENTION

Accordingly, in a first aspect, the invention provides a substantially continuous method for forming a structural panel of indefinite length, said method comprising the steps of preparing a settable mixture including an organic particulate base material consisting at least predominantly of rice hull and a binder, conveying the mixture in a flowable state to a load chamber, progressively forcing the mixture from the load chamber through an inlet toward an outlet of an open ended mould chamber of substantially constant cross-sectional dimensions by compression means, at least partially curing the mixture within the mould chamber, resisting movement of the mixture through the mould chamber until a predetermined consolidation pressure or density within the mould chamber is achieved, subsequently allowing movement of the mixture through the mould chamber in response to further mixture being first forced through the inlet by the compression means, allowing the mixture to cure, and hereby progressively forming a structural panel of substantially indefinite length.

The base material may further include wheat husk, saw dust or other suitable organic or waste products.

In one preferred embodiment the binder is a thermosetting resin binder. More preferably, the binder consists substantially of a thermosetting phenolic resin. The curing or setting process is preferably initiated by heating the mixture within the mould chamber.

Alternatively, the binding medium may include materials such as cementitious binders, to provide the characteristics of masonry. Whilst a thermosetting binder is preferred, it will be appreciated that two part chemical setting resins could be used. Binders curable by ultraviolet radiation or other stimulants are also envisaged.

In other embodiments, additives such as polyvinylacetate or fortified urea formaldehyde may form part of the binding agent for specific purposes such as to provide antibacterial properties. Other agents may also be added to the binding agent to modify the fire, water, weather or rodent resistance of the cured products. For example, it has been found that the use of a magnesite binder substantially improves the fire retardant characteristics of the resultant product.

Preferably, the mixture is formed from a combination of shredded rice hull mixed with a phenolic resin binder in a ratio of approximately 5 to 1 by mass, although different ratios may be used depending upon the desired characteristics of the final product. Desirably, the phenolic resin is potassium hydroxide based with up to around 60% by weight of solids. In another form, a sodium hydroxide based phenolic resin may be used, incorporating up to around 40% by weight of solids. Alternatively, a powdered phenolic resin consisting of 100% solids may be used.

The curing temperature is preferably between 50° and around 200° C. and is ideally around 160° C. The curing pressure within the mould cavity is preferably between 2 and around 80 pounds per square inch, depending upon the desired characteristics of the finished product. More preferably, the curing pressure is between 15 and around 50 pounds per square inch, and most preferably around 40 pounds per square inch.

In one preferred embodiment, the step of resisting movement of the setting mixture is achieved by means of mutually opposed pressure plates engaging opposite sides of the panel through appropriately spaced apertures in the mould. The pressure plates in one preferred embodiment are actuated by respective hydraulic rams in response to a control signal indicative of the pressure or density of the mixture within the mould chamber. In other embodiments, however, it has been found that the frictional resistance between the setting mixture and the surrounding surface of the mould chamber inherently provides the required degree of resistance, so that this step is performed automatically, without the need for independent external pressure application means. This is, however, subject to selection of appropriate materials, mould shape, compression force, curing rate and other relevant parameters.

In a particularly preferred embodiment, a self-centring mandrel is disposed to extend axially through the mould chamber such that the moulded panel is formed with a corresponding longitudinally extending hollow channel. At least two such mandrels are preferably disposed in parallel side by side relationship. The mandrels are preferably heated to allow relatively uniform curing of the panel from within.

According to a second aspect, the invention provides an apparatus for forming a substantially continuous structural panel of indefinite length, said apparatus comprising mixing means to form a settable mixture, transfer means to convey the mixture in a flowable state to a load chamber, compression means adapted progressively to force the mixture from the load chamber through an inlet toward an outlet of an open ended mould chamber of substantially constant cross-sectional dimensions, resisting means adapted initially to resist movement of the mixture through the mould chamber until a predetermined consolidation pressure or density within the mould chamber is achieved and adapted subsequently to allow movement of the mixture through the mould chamber in response to further mixture being forced through the inlet by the compression means, thereby progressively to form a structural panel of substantially indefinite length.

Preferably, the apparatus further includes heating means to initiate curing of the mixture within the mould chamber. Preferably, the compression means take the form of at least one hydraulic ram connected to a piston adapted upon reciprocation to force the mixture from the load chamber to the inlet end of the mould. Preferably, the resisting means include mutually opposed pressure plates engaging opposite sides of the panel. The pressure plates are preferably actuated by respective hydraulic rams.

In the preferred embodiment, the apparatus further includes sensor means adapted to generate a control signal indicative of pressure or density within the mould chamber and control means adapted to regulate the pressure plates in response to the control signal.

The apparatus preferably also includes cutting means in the form of flying, shears adapted to cut the panel into discrete sections of preselected length.

BRIEF DESCRIPTION OF THE DRAWINGS

Preferred embodiments of the invention will now be described, by way of example only, with reference to the accompanying drawings in which:

FIG. 1 is a diagrammatic cross sectional view showing an apparatus for forming a substantially continuous structural panel, according to the invention.

FIG. 2 is a perspective view showing a structural panel manufactured with the apparatus of FIG. 1;

FIG. 3 is an isometric assembly view showing a domestic dwelling constructed substantially from prefabricated panels of the type shown in FIG. 2;

FIG. 5 is a perspective view of a further embodiment of structural panel manufactured according to the invention.

PREFERRED EMBODIMENT OF THE INVENTION

Figure 4:
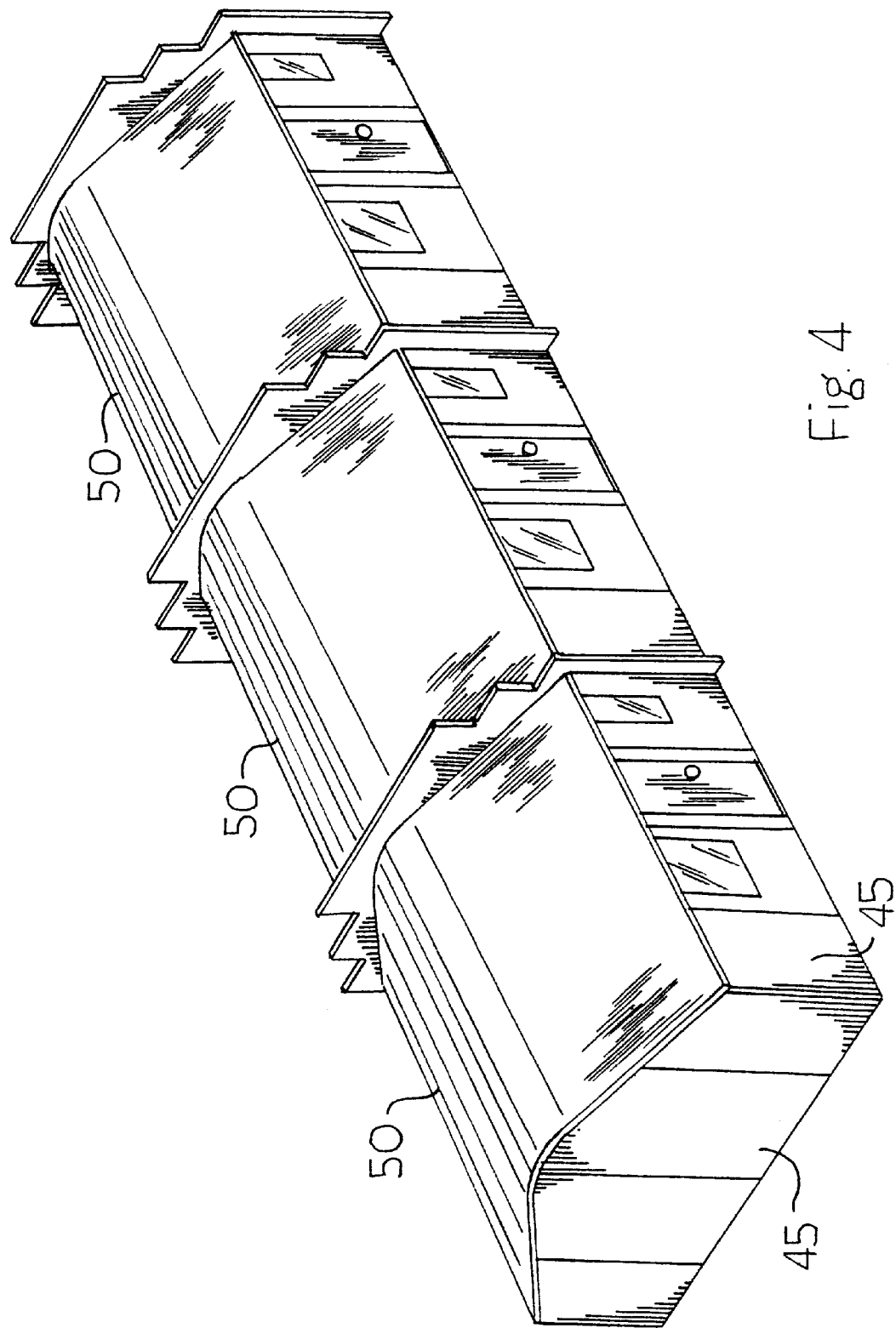
FIG. 4 is a perspective view of a series of adjoining houses constructed according to the assembly technique of FIG. 3.

Referring firstly to FIG. 1, the invention provides an apparatus 1 for forming a substantially continuous structural panel 2 of indefinite length. The apparatus includes mixing means in the form of a mixing drum 3 supported for rotation about a generally horizontal axis 4 by an external drive mechanism (not shown). Mixture from the drum, 3 is fed via a transfer chute 5 to a load chamber 6. In the mixing drum, rice hulls and other suitable materials are mixed with a thermosetting resin binder to form a flowable mixture, as described more fully below.

The apparatus further includes compression means in the form of an hydraulic ram assembly 10 including a piston 11 adapted to reciprocate through the load chamber 6. In doing so, the ram 10 forces mixture progressively from the load chamber through an inlet 15 toward an outlet 16 of an open ended mould chamber 17.

The outer wall 18 of the mould chamber 17 defines a generally rectangular mould cavity of substantially constant cross sectional profile, which corresponds to the external profile of the moulded panel 2 (see FIG. 2). The mould further includes a pair of self-centring mandrels 20 which extend axially at least part way along the mould cavity. The mandrels thus define respective axially extending channels 21 which extend through the panel, as best seen in FIG. 2. The outer walls 18 and the mandrels 20 defining the mould chamber are preferably heated to a temperature of around 160° C., so as to initiate relatively uniform curing of the thermosetting resin, within the mould.

The upper and lower outer walls of the mould are formed with respective apertures 25 to accommodate pressure plates 26. The pressure plates are connected respectively to a pair of mutually opposed hydraulic actuators 27. These actuators act in unison such that extension of the actuators urges the pressure plates toward one another, thereby progressively resisting movement of the panel through the mould chamber. Conversely, retraction of the actuators progressively moves the pressure plates apart and thereby reduces the resistance to movement of the panel through the mould. As an alternative to apertures 25, the entire mould cavity may be divided into two longitudinally spaced halves, with the pressure plates positioned in between. In a further alternative, the pressure plates may be disposed beyond the outlet end 16 of the mould cavity. However, the intermediate location is preferred since in that position, the remote ends of the floating mandrels 20, which extend only part way along the mould cavity, are sandwiched between the pressure plates to provide internal support for the panel, which may be only partially cured at that point.

A pressure sensor 30 is positioned to provide a control signal indicative of pressure or density of the mixture within the cavity. This control signal is used to regulate the actuators 27 and hence the pressure plates 26 in unison such that movement of the partially cured mixture through the mould, is only permitted when a predetermined consolidation pressure or density is achieved. Thus, by repeated compression strokes of the ram 10, a predetermined density of the mixture is achieved at the sensor 30 whereupon the process controller activates the actuators 27 to cause a momentary reduction of pressure on the plates 26. This allows the compressed mixture to advance a limited distance through the mould chamber. When a reduction in density or pressure below a predetermined threshold level is registered at the sensor 30, the process controller reapplies pressure to the plates 26 via the actuators 27 to brake or retard further progress of the partially cured panel through the mould. In this way, the downstream portion of the panel itself forms a choke or end stop for the next compression stroke of the ram 10, as it forces fresh mixture into the inlet end of the mould chamber. This mechanism ensures that the finished product has the required characteristics in terms of strength, density and structural integrity.

It has been found that in some particular configurations of the invention, the frictional resistance between the setting mixture and the surrounding surface of the mould chamber inherently provides the required level of restraining force, so that the braking function is effectively performed automatically, without the need for an independent pressure application mechanism. This is, however, subject to the particular materials in the mixture, the mould shape, the degree of compression, the curing rate of the binder and other relevant parameters.

The outer walls of the mould and the floating mandrels are heated to a temperature of approximately 160° C. to initiate the curing of the thermosetting resins in the mixture within the mould. The temperature, the compression rate and other parameters are selected such that the curing cycle is substantially completed by the time the panel reaches the outlet end of the mould.

Beyond the outlet 16 of the mould, a set of travelling or "flying" shears 40 are disposed to cut the panel into sections of predetermined length. The shears are mounted on a carrier with an optical or other suitable tracking mechanism which enables the shears to form a straight cut perpendicular to the longitudinal axis of the panel, notwithstanding the progressive and possibly intermittent movement of the panel through the mould cavity. Flying shears of this nature are well known to those skilled in the art, and so need not be described in further detail.

The mixture itself is preferably formed predominantly from shredded or ground rice hull and a phenolic resin, in a ratio of approximately 5 to 1 by mass, although different ratios may be used depending upon the desired characteristics of the final product. The preferred phenolic resin is potassium hydroxide based with up to around 60% by weight of solids. Alternatively, a sodium hydroxide based phenolic resin may be used, incorporating up to about 40% by weight of solids. As a further alternative, a powdered phenolic resin consisting of 100% solids may be used. Advantageously, such phenolic resin binders contribute antibacterial properties to the finished product, which is of particular benefit in the food industry. It should be appreciated, however, that other organic waste materials such as sawdust, wheat husk, and the like may be used either as an alternative to or in combination with rice hull. Furthermore, fillers and extenders such as rubber crumb, sisal, jute fibres, veld grass, coconut husk and the like may also be incorporated to provide the desired strength, weight, impact resistance and other properties. It is also noted that other binders may be used. For example, a magnesite binder can be employed to provide additional fire retardant characteristics, whilst cementitious binders may be used to provide masonry-like qualities. Further additives such as polyvinyl acetate or fortified urea formaldehyde may also form part of the binding agent for specific purposes, for example to modify the fire, water, weather or rodent resistance of the cured products.

FIG. 2 shows a panel section 45 formed using the apparatus of FIG. 1 with dimensions suitable for use as an extruded cavity wall panel, as shown in FIG. 3. Such panels are waterproof due to the inherent water resistant characteristics of the rice hull, and are also resistant to rodents and other pests. The product has sufficient structural integrity to obviate the need for an internal framing structure. Moreover, the thermal and acoustic insulation characteristics are excellent, due in part to the cavities running longitudinally through each panel, thereby obviating the need for any additional insulation materials. Thus, the invention provides a modular structural building panel which requires no internal or external framing other than horizontal and vertical tie rods 46 and 47 (as shown in FIG. 3) which simply connect the panels together. The roof may be formed by further panels and tiled if necessary. The panels may be cut to the required height on site, or alternatively, may be supplied pre-cut and simply assembled using non-skilled labour. In this way, the invention provides the basis for an entirely new construction technique for low cost housing which is particularly applicable in developing countries where material resources and skilled labour are both scarce. An example of a low cost housing project in accordance with the invention is shown in FIG. 4 where three dwellings 50 are connected in a terraced configuration. It will be appreciated, however, that any number of dwellings may be provided in any desired configuration depending upon the availability of space, cost constraints and other factors. Doorways may be formed simply by the omission of a panel in the desired location, whereas window openings may be formed by cutting openings where required.

Referring to FIG. 5, in order to further enhance the tensile strength of the panel post tensioning wires 48 may be preheated to 180° C. and then fed into the load chamber and positioned in the mix at locations corresponding to points A, B, C and D in the formed panel. Preferably, the post tensioning wires are deformed in profile so as to allow positive lodgement points for the mixture to adhere to.

As the preheated post tensioning wires are entrapped in the high density cured mix, when the mixture cures and cools the wires (having a significantly greater co-efficient of expansion) will contract considerably more than the relatively inert mixture, thereby exerting a post tensioning action on the cured panel. This in turn greatly increases the structural integrity of the panel, enabling it to be used as a load-bearing flooring section, particularly in high rise and multi-storey buildings.

The panel of FIG. 2 may also be formed in an appropriate size, ideally 1170 mm×1170 mm, to form a pallet. Advantageously, pallets formed in this way have a smooth upper surface so as not to damage the products being transported. Moreover, since no nails are required for assembly, there is no possibility of these working lose over time so as to damage bagged products or other commodities. The pallet design incorporates a minimum number of crevices and other inexcessible spaces where bacteria might bred and is relatively easy to clean. Because of the inherent properties of the rice hull, the pallet is also water resistant and the resin binders provide additional antibacterial properties. It has further been found that the pallet can tolerate a heavy duty service environment with minimal damage.

Perhaps most significantly, however, both the building panel and the pallet are formed substantially from materials which would otherwise simply be disposed of as waste at considerably less cost. For this reason, the panel is particularly inexpensive to produce.

It should also be appreciated that the invention lends itself to numerous other applications. For example, with appropriate mould shapes, the method and apparatus of the invention are readily adapted to form water or sewerage pipes, of indefinite length, thereby minimising the cost of installation. Other products include mine props, road side marker posts, structural building blocks, and virtually any other product having a substantially constant cross sectional profile in at least one direction. In fact, even this limitation is not fundamental, since the panel or product can be milled, machined or otherwise re-shaped after the initial moulding process to produce a structural element of virtually any desired shape, primarily from a waste material. In all these respects, the invention confers numerous practical and commercially significant advantages over the prior art Although the invention has been described with reference to specific examples, it will be appreciated by those skilled in the art that the invention may be embodied in many other forms.

What is claimed is:

1. A method for forming a structural panel of indefinite length, said method comprising the steps of:
   preparing a settable mixture including an organic particulate base material consisting at least predominantly of rice hull and a binder;
   conveying the mixture in a flowable state to a load chamber;
   progressively forcing the mixture from the load chamber through an inlet toward an outlet of an open ended mould chamber of substantially constant cross-sectional dimensions by compression means;
   at least partially curing the mixture within the mould chamber;
   resisting movement of the mixture through the mould chamber until one of a predetermined consolidation pressure and density within the mould chamber is achieved;
   subsequently allowing movement of the mixture through the mould chamber in response to a further mixture being first forced through the inlet by the compression means; and allowing the mixture to cure, thereby progressively forming a structural panel of indefinite length.

2. The method according to claim 1, wherein said binder consists at least predominantly of a thermosetting resin binder.

3. The method according to claim 1, wherein said binder consists at least predominantly of a thermosetting phenolic resin.

4. The method according to claim 1, wherein the base material further includes one of wheat husk, sawdust, rubber crumb, jute and sisal.

5. The method according to claim 1, wherein the binder is selected from the group consisting of a cementitious binding agent, magnesite, polyvinyl acetate and fortified urea formaldehyde.

6. The method according to claim 1, wherein the mixture includes a combination of shredded rice hull and a phenolic resin binder in a ratio of approximately 5:1 by mass.

7. The method according to claim 3, wherein the phenolic resin includes potassium hydroxide based with up to approximately 60% by weight of solids.

8. The method according to claim 3, wherein the phenolic resin includes sodium hydroxide based with up to around 40% by weight of solids.

9. The method according to claim 1, further including the step of raising the mould chamber to a temperature of between approximately 50° and 200° C. to initiate curing of a thermosetting binder within the mould chamber.

10. The method according to claim 9, wherein the temperature of the mould chamber is elevated to approximately 160° C.

11. The method according to claim 1, wherein the pressure within the mould chamber is elevated by the compression means to between approximately 2 and 80 pounds per square inch.

12. The method according to claim 11, wherein the pressure within the mould chamber is elevated to between approximately 15 and 50 pounds per square inch.

13. The method according to claim 11, wherein the pressure within the mould chamber is approximately 40 pounds per square inch.

14. The method according to claim 1, wherein the step of resisting movement of the mixture is performed by means of mutually opposed pressure plates engaging opposite sides of the panel.

15. The method according to claim 14, wherein the pressure plates are actuated by means of hydraulic rams.

16. The method according to claim 14, further including the step of measuring a parameter indicative of one of the pressure and density of the mixture within the mould chamber and regulating the pressure plates by means of a control signal indicative of said parameter thereby maintaining one of the pressure and density of the mixture within the mould chamber within predetermined limits whilst allowing progressive movement of the panel through the mould chamber.

17. The method according to claim 1, wherein the step of resisting movement of the mixture through the mould chamber is performed by frictional resistance between the mixture and a surrounding surface of the mould chamber.

18. The method according to claim 1, further including the step of positioning at least one self-centering mandrel axially within the mould chamber such that the panel is formed with a corresponding longitudinally extending hollow inner channel.

19. The method according to claim 18, including two mandrels, and wherein the two mandrels are disposed in parallel side-by-side relationship.

20. The method according to claim 18, wherein the at least one mandrel is heated to facilitate uniform curing of the panel from within.

21. The method according to claim 1, further including the step of cutting the panel into discrete sections of pre-selected length.

22. The method according to claim 21, wherein said cutting step is performed by means of flying shears adapted to form a substantially straight cut in a direction substantially normal to a longitudinal length of the panel.

23. The method according to claim 1, wherein the structural panel is adapted for use as one of a building panel, a pallet, a mine prop, a roadside marker and a structural building block.

24. An apparatus for forming a substantially continuous structural panel of indefinite length from an organic particulate base material consisting at least predominantly of rice hull and a binder, said apparatus comprising:
   mixing means to form a settable mixture including said organic particulate base material;
   transfer means to convey the mixture in a flowable state to a load chamber;
   compression means adapted to force the mixture from the load chamber through an inlet toward an outlet of an open ended mould chamber of substantially constant cross-sectional dimensions; and
   resisting means having mutually opposed pressure plates engaging opposite sides of the panel, the resisting means adapted to resist movement of the mixture through the mould chamber until one of a predetermined consolidation pressure and density within the mould chamber is achieved,
   wherein the resisting means is further adapted to allow movement of the mixture through the mould chamber in response to a further mixture being forced through the inlet by the compression means thereby progressively forming a structural panel of substantially indefinite length.

25. The apparatus according to claim 24, further including heating means to initiate curing of the mixture within the mould chamber.

26. The apparatus according to claim 24, wherein the compression means include at least one hydraulic ram connected to a piston positioned, upon reciprocation, to force the mixture from the load chamber to the inlet of the mould chamber.

27. The apparatus according to claim 24, wherein the pressure plates are actuated by respective hydraulic rams.

28. The apparatus according to claim 27, further including sensor means adapted to generate a control signal indicative of one of the pressure and density of the mixture within the mould chamber, and control means adapted to regulate the pressure plates in response to the control signal thereby maintaining one of the pressure and density of the mixture within the mould chamber within predetermined limits.

29. The apparatus according to claim 24, further including cutting means adapted to cut the panel into discrete sections of pre-selected length.

30. The apparatus according to claim 29, wherein said cutting means comprise flying shears adapted to form a substantially straight cut extending substantially normal to a longitudinal length of the panel during movement of the panel through the apparatus.

31. The apparatus according to claim 24, wherein the structural panel defines a shape selected from the group consisting of a building panel, a pallet, a mine prop, a roadside marker and a structural building block.

* * * * *